United States Patent
Kupferman

(10) Patent No.: US 7,023,637 B1
(45) Date of Patent: Apr. 4, 2006

(54) DISK DRIVE HAVING A DISK INCLUDING A SERVO BURST PATTERN THAT IMPROVES THE SIGNAL TO NOISE RATIO DURING TRACK FOLLOWING FOR WRITING

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/860,330

(22) Filed: Jun. 1, 2004

(51) Int. Cl.
*G11B 5/09* (2006.01)

(52) U.S. Cl. .................. 360/48; 360/77.08; 360/77.02
(58) Field of Classification Search ................. 360/48, 360/77.01, 77.02, 75, 77.08
See application file for complete search history.

(56) References Cited

U.S. PATENT DOCUMENTS

| | | | |
|---|---|---|---|
| 5,600,506 A | | 2/1997 | Baum et al. |
| 5,717,538 A | | 2/1998 | Cheung et al. |
| 5,801,897 A | | 9/1998 | Kanda et al. |
| 5,923,492 A | | 7/1999 | Liikanen |
| 6,043,952 A | * | 3/2000 | Liikanen ................. 360/77.08 |
| 6,157,511 A | * | 12/2000 | Liikanen ................. 360/77.08 |
| 6,243,223 B1 | | 6/2001 | Elliott et al. |
| 6,366,423 B1 | | 4/2002 | Ahn |
| 6,243,224 B1 | | 7/2002 | Tanner et al. |
| 6,426,845 B1 | | 7/2002 | Sacks et al. |
| 6,574,068 B1 | * | 6/2003 | Hampshire et al. ....... 360/77.08 |
| 6,760,184 B1 | * | 7/2004 | Cunningham ............ 360/77.08 |
| 2002/0114101 A1 | * | 8/2002 | Guzik et al. ............. 360/77.08 |
| 2002/0150179 A1 | * | 10/2002 | Leis et al. ................. 375/340 |

* cited by examiner

*Primary Examiner*—Andrew L. Sniezek
(74) *Attorney, Agent, or Firm*—Alan W. Young, Esq.; Jonathan E. Prejean, Esq.

(57) ABSTRACT

A disk drive has a sampled servo system controller and a disk. The disk has a plurality a plurality servo burst fields, the plurality of servo burst field including first and second normal burst fields, and first and second quadrature burst fields. A portion of the first quadrature burst field is circumferentially contiguous with the first normal burst field and spans a portion of a radial extent of the first normal burst field. The second normal burst field is radially aligned with and away from the first normal burst field and spans a portion of a radial extent of the first quadrature burst field. The second quadrature burst field is radially aligned with and away from the first quadrature burst field and spans a portion of a radial extent of the second normal burst field. The first normal burst field and the first quadrature burst field have a same first phase and the second normal burst field and the first quadrature burst field have a same second phase. The first phase is different than the second phase.

3 Claims, 6 Drawing Sheets

DISK DRIVE HAVING A DISK INCLUDING A SERVO BURST PATTERN THAT IMPROVES THE SIGNAL TO NOISE RATIO DURING TRACK FOLLOWING FOR WRITING

BACKGROUND OF THE INVENTION

1. Field of the Invention

The present invention relates to disk drives and to the pattern of the servo burst fields written to disks used in such disk drives.

2. Description of the Prior Art and Related Information

In a conventional disk drive, each recording surface of each magnetic disk contains a plurality of concentric data tracks angularly divided into a plurality of data sectors. In addition, special servo information is provided on this disk or another disk to determine the position of the head. The most popular form of servo is called "embedded servo" wherein the servo information is written on this disk in a plurality of servo sectors that are angularly spaced from one another and interspersed between data sectors around the track. Each servo sector generally comprises a track identification (ID) field and a group of servo bursts that the servo control system samples to align the transducer head with or relative to a particular data track. Each servo burst is conventionally formed from a series of magnetic transitions defined by an alternating pattern of magnetic domains.

The servo control system moves the transducer toward a desired track during a coarse "seek" mode using the track ID field as a control input. Once the transducer head is generally over the desired track, the servo control system uses the servo bursts to keep the transducer head over that track in a fine "track following" mode. The transducer generally reads the servo bursts to produce a Position Error Signal (PES) that is 0 when the transducer is at a particular radial position. The position where the PES=0 may or may not be at the data track center, depending on the magnetic characteristics of the transducer, the arrangement of the servo bursts, and the formula used to calculate the PES.

Conventionally, the servo burst written by the servo track writer include groups of four discrete servo bursts that are identified as A, B, C and D and that are disposed at predetermined positions relative to a track centerline. The A and B bursts may be thought of as in-phase and the C and D bursts are placed in "quadrature" with the A and B bursts, in that the edges of the C and D bursts may be aligned with the centers of the A and B bursts or may span a portion of a radial extent of the A and B bursts. With four bursts A, B, C, D positioned in quadrature, there are two burst pair centerlines (also called Track Center or TC herein) per data track pitch, i.e. one burst pair centerline every 50% of a data track pitch. The read/write transducer, therefore, will always pass over an A/B pair or a C/D pair of servo bursts because it is always within 25% of a data track pitch from an A/B or C/D burst pair centerline.

However, competitive pressures are such that disk drive designers continually seek to improve yield and capacity. The servo information conveyed by the servo bursts, although essential to the operation of the drive, is generally considered to be overhead. The area of the disk recording surface that is occupied by servo bursts cannot be used to record user data. Some of this recording surface real estate conventionally occupied by the four embedded A, B, C and D servo burst fields would be better utilized for recording user data. Improving the servo burst format by reducing the amount of the area of the disk recording surface that is occupied by the servo bursts would, in turn, correspondingly improve both yield and efficiency.

SUMMARY OF THE INVENTION

According to an embodiment thereof, the present invention is a disk drive having a sampled servo system controller and a head having a read transducer and a write transducer and a disk having a plurality of servo burst fields. The plurality of servo burst fields include a first normal burst field; a first quadrature burst field, a second normal burst field and a second quadrature burst field. A portion of the first quadrature burst field may be circumferentially contiguous with the first normal burst field and may span a portion of the radial extent of the first normal burst field. The second normal burst field may be radially aligned with and away from the first normal burst field and may span a portion of a radial extent of the first quadrature burst field. The second quadrature burst field may be radially aligned with and away from the first quadrature burst field and may span a portion of a radial extent of the second normal burst field. The first normal burst field and the first quadrature burst field may have a same first phase, and the second normal burst field and the second quadrature burst field may have a same second phase that is different than the first phase. When the disk drive positions the head in a track following mode for writing, the read transducer may be disposed over an about equal and non-zero amount of the first normal burst field and first quadrature field or over an about equal and non-zero amount of the second normal burst field and second quadrature field.

The about equal and non-zero amount may be between about 50% and about 90% of the full amplitude of the normal or quadrature first and second bursts. The about equal and non-zero amount may be between about 65% and about 75% (such as about 70%, for example) of full amplitude of the normal or quadrature first and second bursts.

According to another embodiment thereof, the present invention is a method of writing to a magnetic disk drive, the magnetic disk drive including a head that includes a read transducer and a write transducer that is offset from the read transducer. The method may include the steps of providing a disk having a recording surface having embedded servo sectors that include a normal servo burst field and a circumferentially adjacent and radially offset quadrature servo burst field; positioning the read transducer over an about equal and non-zero amount of the normal burst field and the quadrature field and such that the write transducer is positioned to write over a predetermined track, maintaining the read transducer over the about equal and non-zero amount of the first normal burst field and the quadrature field while the disk rotates, and writing to the predetermined track using the write transducer.

The positioning step may be carried out with the about equal and non-zero amount between about 50% and about 90% of full amplitude of the normal or quadrature bursts. The positioning step may be carried out with the about equal and non-zero amount between about 65% and about 75% of full amplitude of the normal or quadrature bursts. The providing step may be carried out with the normal burst field and the quadrature burst field being of a same polarity.

BRIEF DESCRIPTION OF THE DRAWINGS

FIG. 1A also shows the position of the read transducer relative to the servo bursts when the write transducer is on track for writing, according to an embodiment of the present invention.

DETAILED DESCRIPTION

Figure 1A:
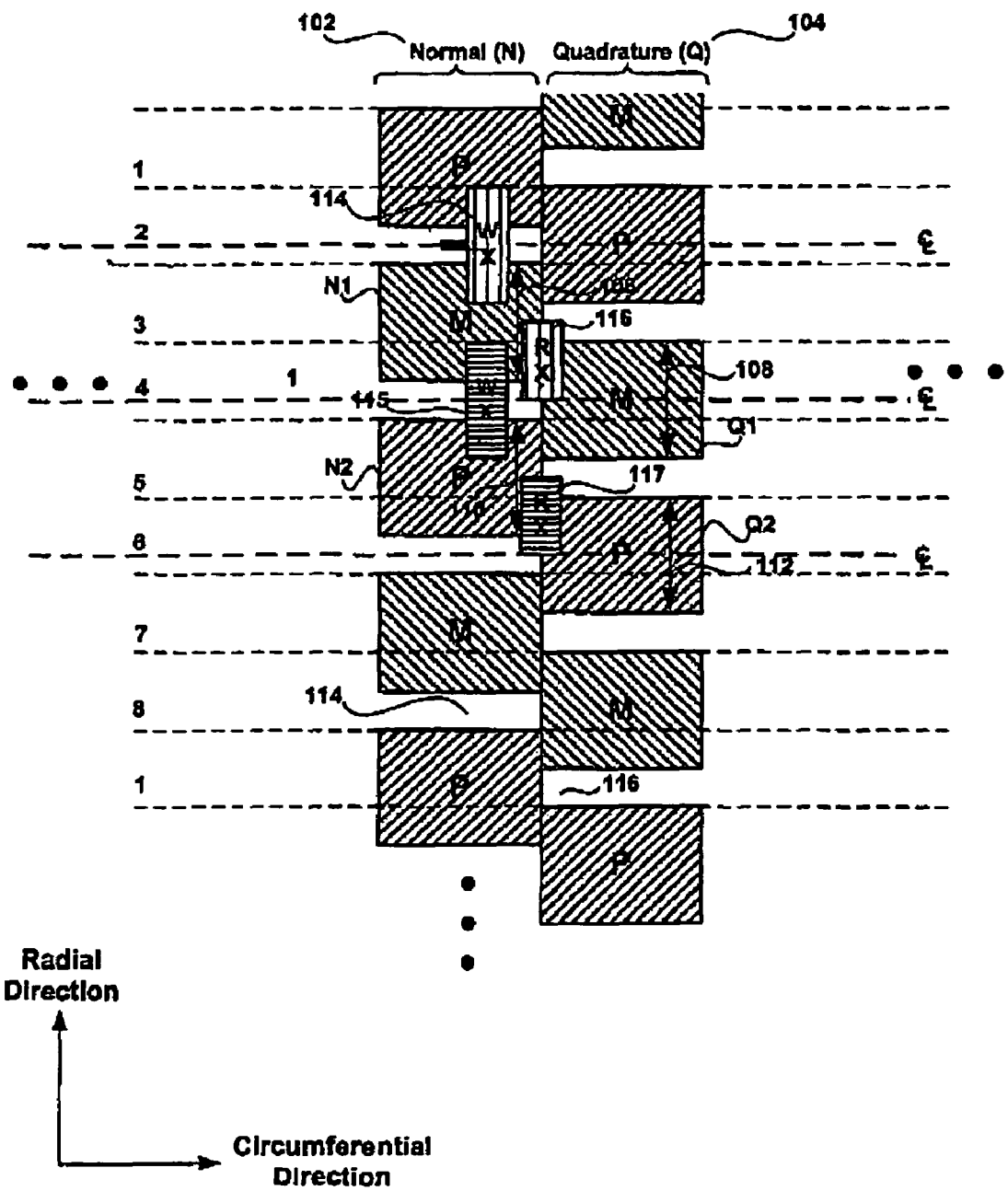
FIG. 1A shows the arrangement of normal and quadrature servo burst fields recorded on a disk of a disk drive according to an embodiment of the present invention.
Figure 1B:
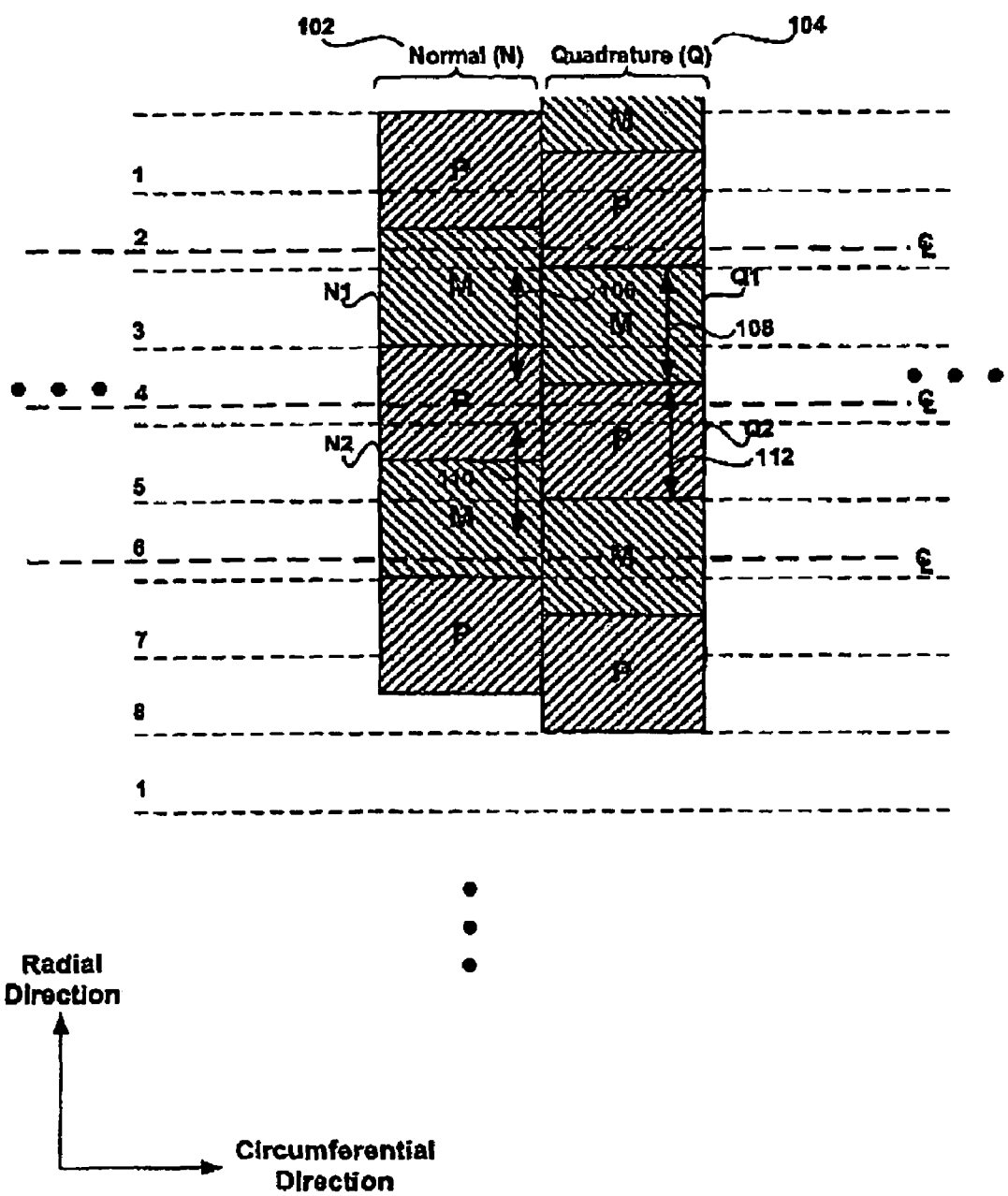
FIG. 1B shows an alternative arrangement of the normal and quadrature servo burst fields on a disk of a disk drive according to and suitable for use in conjunction with an embodiment of the present invention.

FIG. 1A shows the arrangement of normal and quadrature servo burst fields recorded on a disk of a disk drive having a sampled servo system controller, according to an embodiment of the present invention. The servo burst fields include radially aligned normal burst fields 102 and radially aligned quadrature burst fields 104. Radially adjacent normal burst fields 102 have different phases and radially adjacent quadrature burst fields 104 have different phases. According to an embodiment of the present invention, the normal and quadrature burst fields 102, 104 include servo burst fields having a first phase P and a second phase M. According to an embodiment of the present invention, the difference between the first and second phases P and M may be 180 degrees. As shown in FIG. 1A, the servo burst fields written on the disk may include a first normal burst field N1 of the first polarity M and a first quadrature burst field Q1, also of the first polarity M. A portion of the first quadrature burst field Q1 may be circumferentially contiguous with the first normal burst field N1 and may span a portion of a radial extent 106 of the first normal burst field N1. A second normal burst field N2 of polarity P may be written to the disk, such that it is radially aligned with and away from the first normal burst field N1 of polarity M. Moreover, the second normal burst field N2 may span a portion of the radial extent 108 of the first quadrature burst field Q1. A second quadrature burst field Q2 of polarity P may be written to the disk, such that it is radially aligned with and away from the first quadrature bunt field Q1. The second quadrature burst field Q2 may span a portion of a radial extent 110 of the second normal burst field N2. According to another embodiment of the present invention, the second normal burst field N2 may be contiguous with the first normal burst field N1 and the second quadrature burst field Q2 may be contiguous with the first quadrature burst field Q1. Whereas the radially adjacent servo burst fields in FIG. 1A are separated from one another by a gap, the embodiment of FIG. 1B is such that radially adjacent servo burst fields are not separated by such a gap.

Also shown in FIG. 1A are exemplary the read and write transducers (shown as RX and WX, respectively) of the disk drive's slider that is coupled to the actuator that is radially swept over the recording surface of the disk (such as disk 200 shown in FIG. 5) during writing and reading operations. A write transducer is shown at 114 and its read transducer is shown at reference numeral 116. The write transducer 114 defines a write transducer width and the widths 106, 110 of the first and second normal burst fields N1, N2 and the widths 108, 112 of the first and second quadrature burst fields Q1 and Q2 are dictated by this write transducer width. Such burst fields may advantageously be carried out by writing the servo burst fields using a technique that may be called "Write Whole Burst" (WWB).

Conventionally, A, B, C, D servo bursts (such as shown, for example, in U.S. Pat. No. 6,157,511) are exactly 1 track wide or, for example, there may be three sets of servo bursts for every 1½ tracks. This may be achieved by composing the burst out of two servo burst field portions, each servo burst field portion being ½ track wide. Indeed, each such servo burst field A, B, C, D may be recorded in two steps, separated exactly by ½ track. In this manner, the write transducer writes one servo burst field and also "trims" (if necessary) the unnecessary servo burst field portions everywhere else. However, a drawback of this method is that when the read transducer being used by the servo is narrow (for example 50% of the track width), when the head moves across the servo bursts fields, there will be significant zones in which there are no changes in the magnetic field. When the read transducer does not detect changes in the magnetic fields as it sweeps over the embedded servo patterns, the servo is unable to derive an accurate PES signal from the signal induced within the read transducer.

According to an embodiment of the present invention, this issue may be overcome by using the width of the write transducer 114 and the read transducer 116 to write and read servo burst fields that are arranged such that the signal generated by the read transducer 116 as it travels over the servo burst fields all or most of the time exhibits variations and thus is able to convey positional information This may be carried out by writing the servo burst fields only once, the width of the written servo burst fields being defined by the width of the write transducer 114. The disk defines a plurality of concentric tracks and each of the tracks defines a track width In FIG. 1A, the tracks are shown delimited by dashed lines and are labeled 1, 2, 3, 4, 5, 6, 7, 8, 1 . . . . For example, the width of the write transducer may be 0.7 of the width of the tracks 1, 2, 3, 4, 5 . . . The other servo burst fields may be skipped such that no trimming takes place. In this manner, each servo burst field is laid down onto the recording surface of the disk fully formed in a single pass. According to an embodiment of the present invention, each of the first and second normal burst fields N1, N2 and each of the first and second quadrature burst fields Q1, Q2 spans a radial extent that is greater than half of the width of the tracks 1, 2, 3, 4, 5 . . . and the read transducer 116 may have a width that is, for example, 0.6 of the width of the tracks.

According to embodiments of the present invention, the embedded servo burst fields described above are configured to enable the sampled servo system controller of the disk drive to determine a servo correction signal (Position Error Signal or PES) that includes a servo correction magnitude and a servo correction direction from a reading of only two circumferentially adjacent servo burst fields, such as, for example, the first normal burst field N1 and second quadrature burst field Q1 read by the read transducer 116. The read transducer 116 is shown in FIG. 1A in a position in which the read transducer 116 is positioned to allow the write transducer 114 to track follow for writing. Indeed, an embodiment of the present invention calls for the disk drive to position the read transducer 116 so as to enable the write transducer 114 to track follow for writing operations. To do this according to an embodiment of the present invention, the read transducer 116 may be disposed over an about equal and non-zero amount of the first normal burst field N1 and the first quadrature field Q1 or over an about equal and non-zero amount of the second normal burst field N2 and the second quadrature field Q2, both of which are shown in FIG. 1A. As shown, the write transducer 114 is offset from the read transducer 116 by a fixed amount. Therefore, precise positioning of the read transducer 116 will also precisely position the write transducer 114. According to an embodiment of the present invention, the write transducer 114 is in the proper position for track following and writing operations when the read transducer 116 is over a non-zero and about equal amount of the surface areas of N1, Q1 or over a non-zero and about equal amount of the surface areas of N2, Q2, as shown in FIG. 1A. The write transducer 114 is shown positioned for track following the read transducer 116 over N1 and Q1 of polarity M. For illustrative purposes only, another head is also shown in FIG. 1A. Indeed, a read transducer 117 and an offset write transducer 115 are also shown. The read transducer 117 is shown in FIG. 1A as being disposed over a non-zero and about equal amount of the N2 and Q2 servo burst fields, both of which are of polarity P. This accurately positions the write transducer 115 for track following for writing.

The embodiment of the present invention shown in FIG. 1A has several advantages over conventional PES generation from conventional (e.g., A, B, C an) servo burst fields. At the outset, using only two servo burst fields (N and Q) instead of four servo burst fields (A, B, C and D) improves the format efficiency by reducing the surface of the disk recording area encoded with servo information. In turn, this correspondingly increases the surface of the disk available for user addressable data. Moreover, because the read transducer is over a non-zero and about equal amount of the surface areas of two servo bursts when the write transducer is track following for writing, the signal to noise ratio of the signals read by the read transducer is greater than is the case in conventional disks and disk drives. Indeed, according to an embodiment of the present invention, the about equal and non-zero amount may between about 50% and about 90% of the full amplitude of the N1, Q1 or N2, Q2 servo burst field pairs. According to another embodiment, the about equal and non-zero amount may be between about 65% and about 75% of the full amplitude of the N1, Q1 or N2, Q2 servo burst field pairs. For example, the about equal and non-zero amount may be about 70% of the full amplitude of the N1, Q1 or N2, Q2 servo burst field pairs. By selecting the position of the read transducer such that a signal is induced thereon that is about 70% of the full amplitude of the N1, Q1 or N2, Q2 servo burst field pairs during track following for writing, a high signal to noise ratio is achieved, as compared to conventional drives in which the read transducer may be positioned such that a zero amplitude signal is induced when the drive is track following for writing. Indeed, in conventional drives, when the read transducer is over an equal amount of two servo burst fields of opposing polarity, the resultant signals induced upon the read transducer cancel (or nearly cancel) each other out, resulting in a PES of zero. However, this also means that the signal to noise ration of the signal induced in the read transducer of the drive is very high, making it difficult to discriminate the signal from the noise. By configuring the drive's head and/or the servo burst fields such that track following for writing is carried out when the read transducer is over a non-zero and about equal amount (e.g., 70%) of the N1, Q1 or N2, Q2 servo burst field pairs, the amplitude of the resulting signal is more clearly distinguishable from the noise, making it easier to generate an accurate PES signal therefrom.

Figure 2:
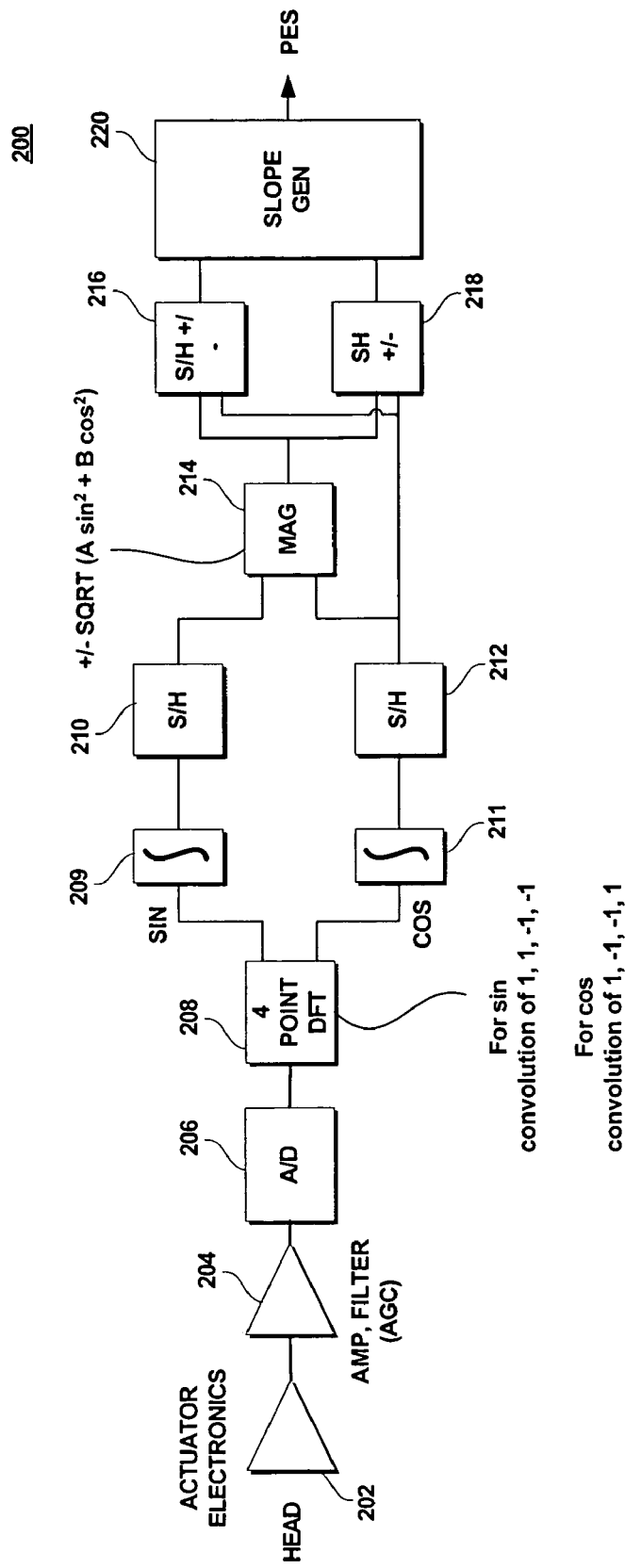
FIG. 2 is a block diagram illustrating aspects of a DFT-type demodulator suitable for reading and processing the normal (N) and quadrature (Q) servo burst fields to generate a Position Error Signal (PES), according to an embodiment of the present invention.

FIG. 2 is a block diagram illustrating aspects of a demodulator suitable for reading and processing the normal and quadrature servo burst fields of FIG. 1A to generate such a PBS, according to an embodiment of the present invention. According to an embodiment of the present invention, the read transducer 116 of the slider reads the servo bursts that are laid down on the recording surface of the disk, such as shown in FIG. 1A. The read signal may then be amplified in the actuator electronics shown at 202, whereupon the amplified signal is fed to the read channel where it may be amplified and filtered, as shown at 204. The gain may be regulated by an automatic gain control. The amplified, filtered and gain regulated signal output from 204 may then be digitized and fed to a 4-point Discrete Fourier Transform (DFT) unit where the signal may be convoluted by 1, 1, −1, −1 to obtain the sine component of the signal and convoluted by 1, −1, −1, 1 to obtain the cosine component of the signal. The sine and cosine components output from the 4-point DFT 208 are then integrated in integrators 209, 211 and each be fed to a sample and hold S/H 210, 212, respectively. The output of the S/H 210, 212 are then further processed to derive therefrom the magnitude of the signal. That is, the MAG unit carries out a square root operation upon the sum of the squares of the sine and cosine components of the signal. The calculated magnitude is then sampled and held at 216, 218, and the outputs thereof are fed to the slope generator 220 to derive the PES sigal. Embodiments of the present invention (FIGS. 3A and 3B) utilize only the magnitude of the signal, whereas other embodiments of the present invention (FIGS. 4A and 4B) utilize both the magnitude of the signal as well as the polarity thereof, as is detailed below. The cosine value carries the polarity information of the PES signal. When the signal is in phase (the cos=1), then no phase inversion is necessary. When the signal is out of phase (180 degrees, cos=−1), then the PES signal is inverted. This provides the direction of the correction necessary to move the write transducer closer to the track centerline and to enable continued track following operations. The slope generator 220 derives the PES signal from the slopes of the N and Q (and −N and −Q) signals, as detailed below.

Figure 3A:
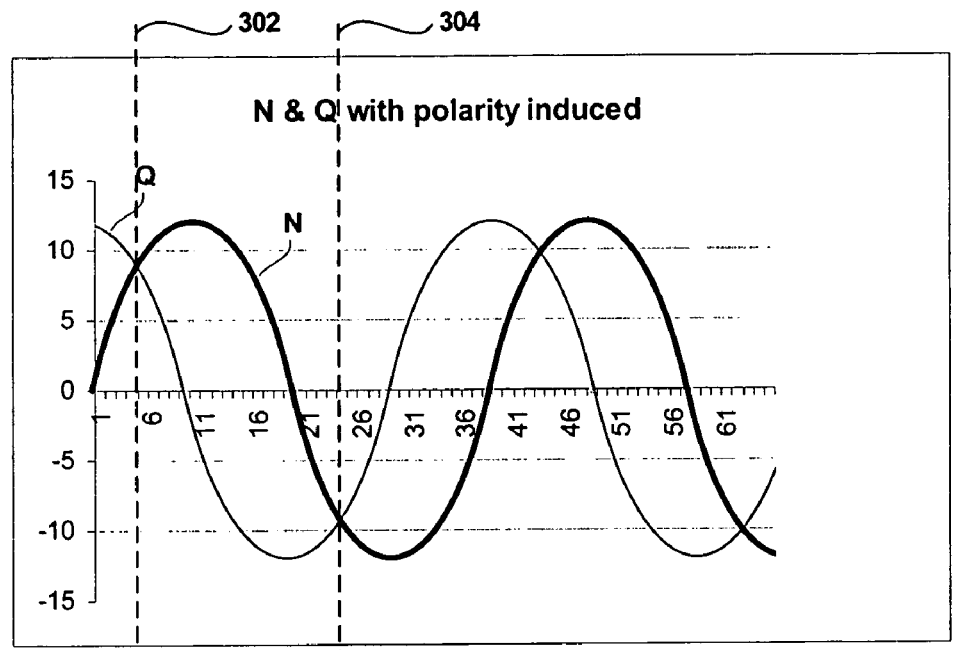
FIG. 3A is a graph representative of exemplary N and Q signals (including both magnitude and polarity) induced upon the read transducer of a disk drive according to an embodiment of the present invention.
Figure 3B:
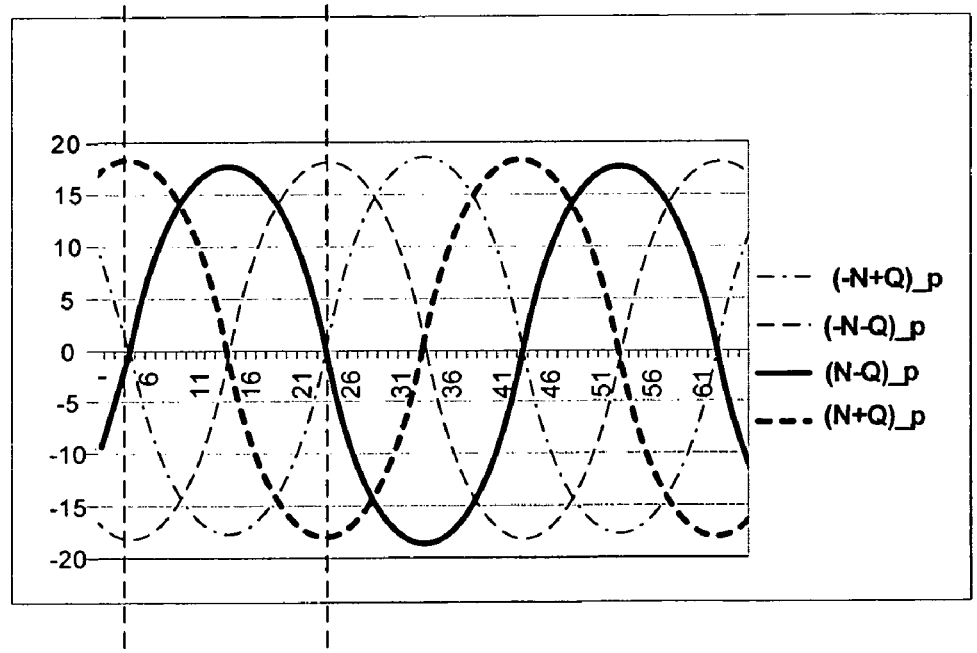
FIG. 3B is a graph representative of summed normal and quadrature signals of FIG. 3A, showing the sum of the +/−N and +/−Q signals from which a PES signal may be derived, according to an embodiment of the present invention.

FIG. 3A is a graph representative of exemplary signals induced upon the read transducer of a disk drive according to an embodiment of the present invention. As shown, the N and Q signals processed through the demodulator exhibit a swing between positive and negative values. Such signals may be generated by the demodulator circuit of FIG. 2 from a read transducer disposed over the servo burst fields arranged, for example, as shown in FIG. 1A. As shown, the magnitude and polarity of the induced N and Q signals, in this exemplary case, swing between a positive 12 and a negative 12. According to an embodiment of the present invention, the write transducer (such as shown at 114 in FIG. 1A) may be considered to be on track (e.g., disposed squarely over the centerline) for writing when the read transducer (shown at 116 in FIG. 1A) is disposed over the normal and quadrature servo burst fields such that it is over an about equal and non-zero amount of the first normal burst field N1 and first quadrature field Q1 or over an about equal and non-zero amount of the second normal burst field N2 and second quadrature field Q2. This state of the read transducer 116 is shown by the dashed vertical lines 302 and 304. The underscore "_p" in FIGS. 3A and 3B denote "polarity", as opposed to the underscore "_a" in FIGS. 4A and 4B, which denotes "absolute value". Dashed vertical line 302 intersects the Q and N signals when they are both non-zero and about equal (in this case, about a magnitude of +9). Likewise, dashed vertical line 304 intersects the Q and N signals when they are both non-zero and about equal (in this case, about a magnitude −9). As noted above, the +N, −N, +Q and −Q signals are made available by the read transducer 116 and the demodulator of FIG. 2. The read transducer 116 sums the contributions of the servo burst fields over which it passes. What results are waveforms for (−N+Q)_p, (−N−Q)_p, (N−Q)_p and (N+Q)_p, each of which are shown in FIG. 3B. As can be seen in FIG. 3B, each of these waveforms defines highly linear portions from which an accurate PES signal may be derived. According to an embodiment of the present invention and as shown in FIGS. 3A and 3B, the read transducer is properly positioned to enable the write transducer to track follow and write when N and Q are both positive as shown at 302 and when N+Q and (−N−Q) are at or about their maximum and (−N+Q) and (N−Q) are at or about zero. Similarly, the read transducer may also be properly positioned to enable the write transducer to track follow and write when N and Q are both negative as shown at 304 when (−N−Q) and (N+Q) are at or about their maximum amplitude and (−N+Q) and (N−Q) are at or about zero. As can be seen from inspection of FIG. 3A, the waveforms of FIG. 3B define highly linear regions (from about −15 to +15 for each of the (−N+Q), (−N−Q), (N−Q) and (N+Q) signals in this illustrative example) from which a highly accurate PES signal may be calculated.

Figure 4A:
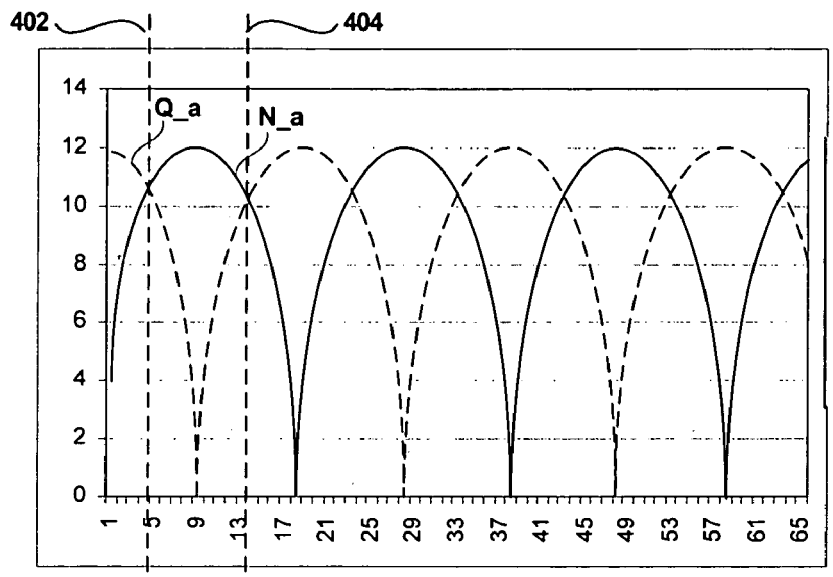
FIG. 4A is a graph showing exemplary N and Q waveforms, according to an embodiment of the present invention in which only the magnitude of the N and Q signals is considered.

FIG. 4A is a graph representative of exemplary signals induced upon the read transducer of a disk drive according to another embodiment of the present invention. In this embodiment, the normal and quadrature N and Q signals induced upon the read transducer have only positive magnitudes; that is, the signals swing between zero or near zero magnitude and a maximum positive magnitude—in this case, a magnitude of about 12. The waveforms of FIG. 4A may be thought of as the absolute value of the waveforms shown in FIG. 3A. The magnitudes of the N and Q signals induced on the read transducer may be taken from reference numeral 224 in FIG. 2.

Figure 4B:
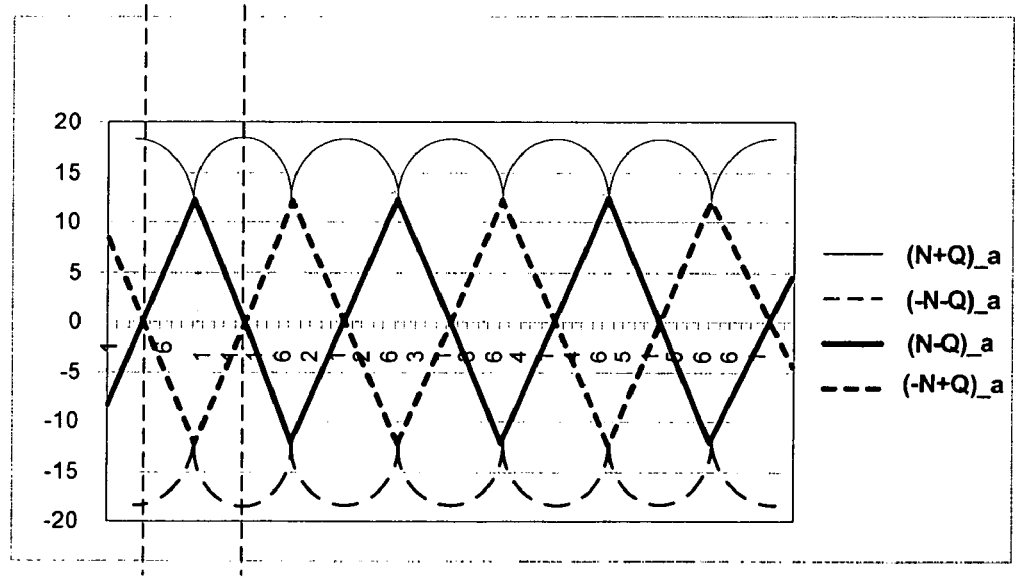
FIG. 4B is a graph showing manipulated (e.g., the sum and difference of the magnitudes of the) N and Q signals waveforms of FIG. 4A, according to an embodiment of the present invention.

As is the case when the phase of the N and Q signals are taken into account (as it is in FIGS. 3A and 3B), the read transducer, according to this embodiment of the present invention, is properly positioned to allow the write transducer to track follow and write when the read transducer is disposed over a non-zero and about equal amount of the N and Q servo burst fields, which is the situation shown by dashed line 402. When the read transducer is positioned in this manner, the manipulated waveforms generated by the demodulator of FIG. 2 (i.e., (N+Q), (−N−Q), (N−Q and (−N+Q)) are as shown in FIG. 4B. As shown therein, the waveforms (N+Q) and (−N−Q) are not used for PES generation in the embodiments herein, as they do not exhibit linear regions of sufficient breadth. For PES generation, therefore, this embodiment of the present invention relies upon the (N−Q) and (−N+Q) manipulated waveforms. Indeed, the (N−Q) and (−N+Q) waveforms are each defined by highly linear regions (from about −12 to +12 magnitude), which make them ideal for PES generation over that range. As shown in FIGS. 4A and 4B, at 402 (when the N and Q signals induced in the read transducer are non-zero and equal or about equal), then (N−Q) waveform is at or about zero amplitude and at or about the middle of its amplitude swing from negative to positive. Likewise, at 402 (when the N and Q signals induced in the read transducer are non-zero and equal or about equal), then (N−Q) waveform is at or about zero amplitude and at or about the middle of its amplitude swing from negative to positive. Likewise, at 404, the (−N+Q) waveform of FIG. 4B is at or near zero amplitude and at or about the middle of its amplitude swing from negative to positive. As can be seen from FIGS. 4A and 4B, each position on the Q and N waveforms may be mapped a linear portion of either the (N−Q) or (−N+Q) waveforms for PES generation from which both the magnitude and the direction of the correction to apply to the head of the drive may be computed.

Figure 5:
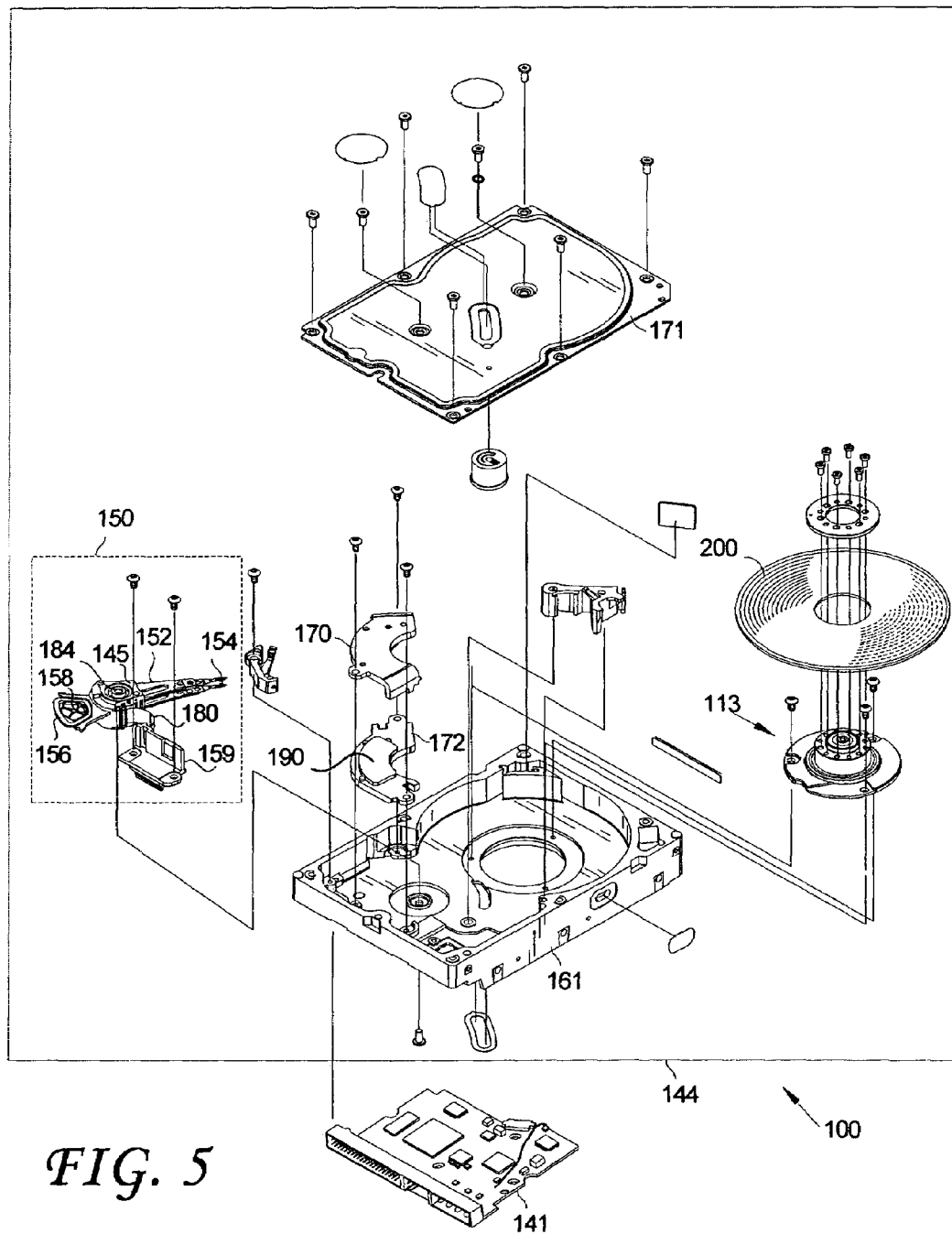
FIG. 5 is an exploded view of a magnetic disk drive according to an embodiment of the present invention.

FIG. 5 shows the principal components of a magnetic disk drive 100 according to an embodiment of the present invention. With reference to FIG. 5, the disk drive 100 comprises a head disk assembly (HDA) 144 and a printed circuit board assembly (PCBA) 141. The HDA 144 includes a base 161 and a cover 171 attached to the base 161 that collectively house one or more disks 200 (only one disk 200 is shown in FIG. 5), a spindle motor 113 attached to the base 161 for rotating the disk 200, a head stack assembly (HSA) 150, and a pivot bearing cartridge 184 that rotatably supports the HSA 150 on the base 161. The disk shown at 200 in FIG. 1A is provided with embedded servo patterns as shown at FIG. 1A and/or as described above. The spindle motor 113 rotates the disk 200 at a constant angular velocity. The HSA 150 comprises a swing-type or rotary actuator assembly 152, at least one head gimbal assembly that includes the suspension assembly 154, a flex circuit cable assembly 180 and a flex bracket 159. The rotary actuator assembly 152 includes a body portion 145, at least one actuator arm cantilevered from the body portion 145, and a coil assembly including a coil 156 cantilevered from the body portion 145 in an opposite direction from the actuator arm(s). A bobbin 158 may be attached to the inner periphery of the coil assembly to stiffen the coil assembly. The actuator arm(s) support respective suspension assembly(ies) that, in turn, support read/write transducer(s) (116, 114 shown in FIG. 1A) for reading and writing to the disk 200. The HSA 150 is pivotally secured to the base 161 via the pivot-bearing cartridge 184 so that the read/write transducer(s) at the distal end of the suspension assembly(ies) may be moved over the recording surface(s) of the disk(s) 200. The pivot-bearing cartridge 184 enables the HSA 150 to pivot about its pivot axis. The "rotary" or "swing-type" actuator assembly rotates on the pivot bearing cartridge 184 between limited positions, and the coil assembly that extends from one side of the body portion 145 interacts with one or more permanent magnets 192 mounted to back irons 170, 172 to form a voice coil motor (VCM). When a driving voltage is applied to the VCM, torque is developed that causes the HSA 150 to pivot about the actuator pivot axis and causes the read/write transducer(s) to sweep radially over the disk 200.

The invention is claimed is:

1. A disk drive having a sampled servo system controller, a head including a read transducer and a write transducer and a disk having a plurality of servo burst fields, the plurality of servo burst fields comprising:
   a first normal burst field;
   a first quadrature burst field, a portion of the first quadrature burst field being circumferentially contiguous with the first normal burst field and spanning a portion of a radial extent of the first normal burst field;
   a second normal burst field, the second normal burst field being radially aligned with and away from the first normal burst field, the second normal burst field spanning a portion of a radial extent of the first quadrature burst field;
   a second quadrature burst field, the second quadrature burst field being radially aligned with and away from the first quadrature burst field, the second quadrature burst field spanning a portion of a radial extent of the second normal burst field, the first normal burst field and the first quadrature burst field having a same first phase, the second normal burst field and the second quadrature burst field having a same second phase, the first phase being different than the second phase;
   wherein when the disk drive positions the head in a track following mode for writing, the read transducer is disposed over an about equal and non-zero amount of the first normal burst field and first quadrature field or over an about equal and non-zero amount of the second normal burst field and second quadrature field.

2. The disk drive of claim 1, wherein the about equal and non-zero amount is between about 50% and about 90% of full amplitude of the normal or quadrature first and second bursts.

3. The disk drive of claim 2, wherein the about equal and non-zero amount is between about 65% and about 75% of full amplitude of the normal or quadrature first and second bursts.

* * * * *